INVENTOR
PLACIDO LEANDRO BUYATTI
BY Hubbell, Cohen &
Stiefel

ATTORNEYS.

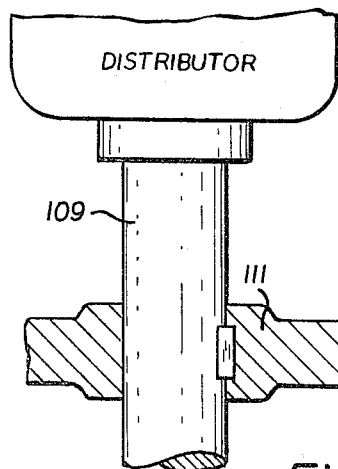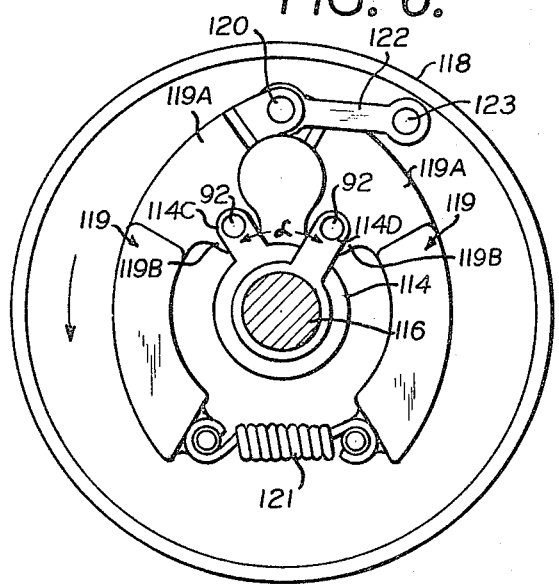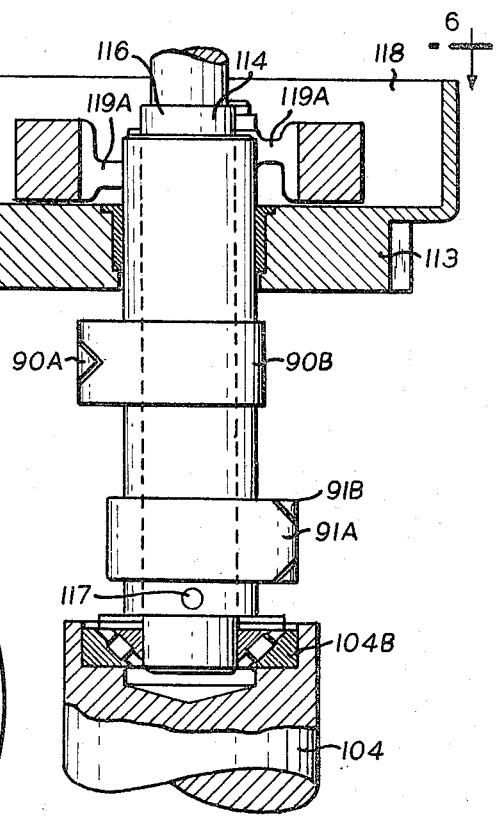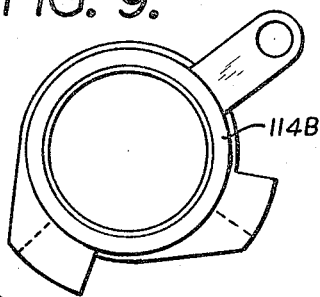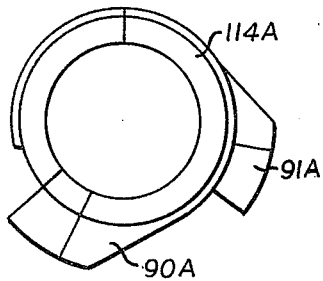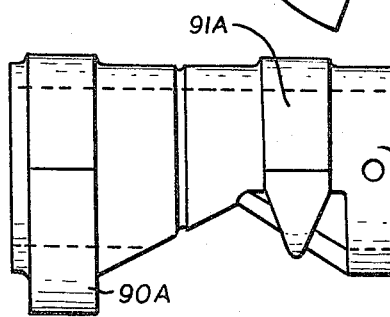

March 14, 1967 P. L. BUYATTI ETAL 3,308,797
INTERNAL COMBUSTION ENGINE
Filed April 6, 1964
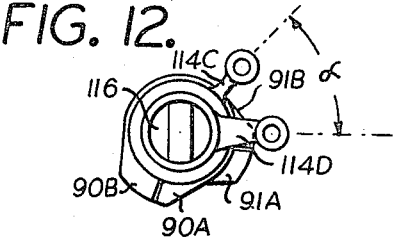
FIG. 12.
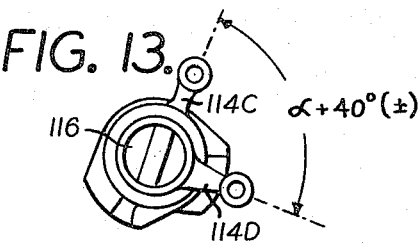
FIG. 13.
FIG. 14.
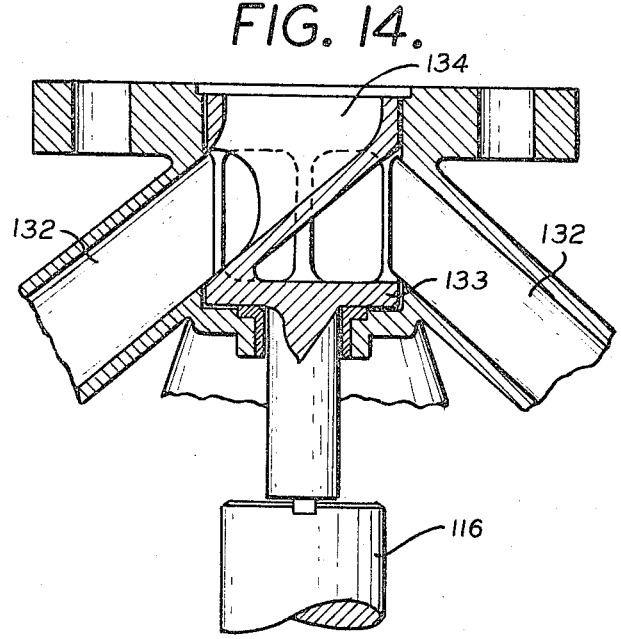
FIG. 15.
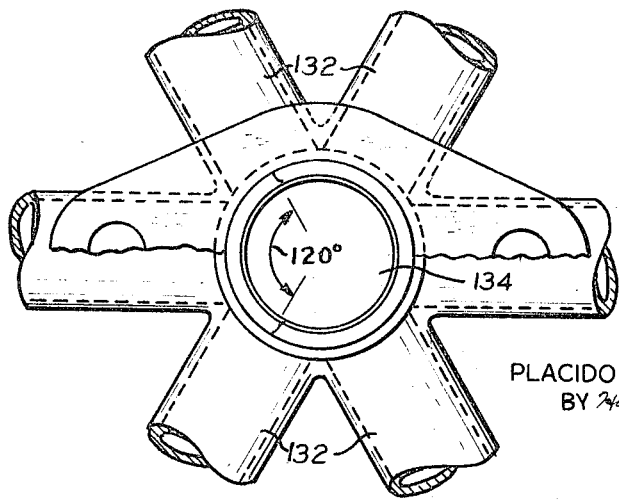
INVENTOR
PLACIDO LEANDRO BUYATTI
BY Hubbell, Cohen &
Stiefel
ATTORNEYS.

United States Patent Office 3,308,797
Patented Mar. 14, 1967

3,308,797
INTERNAL COMBUSTION ENGINE
Placido Leandro Buyatti, Vincente Lopez, Buenos Aires, Argentina, assignor to Sociedad Civil de Estudio e Investigaciones del Desarrollo y Progreso del Automotor y Mandatos B.M.B., Buenos Aires, Argentina, a corporation of Argentina
Filed Apr. 6, 1964, Ser. No. 357,421
4 Claims. (Cl. 123—90)

This invention relates in general to an internal combustion engine, and more specifically to a variable speed internal combustion engine capable of automatically attaining substantially constant maximum torque over a relatively wide range of engine speeds.

Heretofore, variable speed internal combustion engines have been constructed and arranged so that the opening and closing times of the valves were invariable. Thus, the valve setting in relationship to the angular position of the crank shaft was fixed at all speeds of the engine. For this reason, designers of internal combustion engines were required to select that fixed setting of the valve relative to the angular position of the crank shaft that would result in maximum torque at only a predetermined or selected engine speed. Consequently, at engine speeds above and below the predetermined design speed for maximum torque, the available torque and resulting engine efficiency decreased appreciably, accordingly. Also, other motor or engine accessory systems, such as the ignition system and carburation system were also similarly influenced.

Therefore, an object of this invention is to provide a variable speed internal combustion engine capable of automatically attaining constant torque over a relatively wide range of engine speeds, and consequently attain a maximum of efficiency.

Another object is to provide an internal combustion engine in which the opening and closing times of the valves are varied in proportion to the speed of the engine.

Another object is to provide an internal combustion engine in which the firing order is inverse to the rotation of the crank shaft.

Still another object is to provide a multiple cylinder, variable speed, internal combustion engine in which the respective intake and exhaust valves of each cylinders are sequentially actuated by a single variable camming means.

Still another object of this invention is to provide a variable speed internal combustion engine in which the fuel is uniformally distributed to each of the respective cylinders of the engine so that the optimum supply of fuel is supplied to each of the cylinders throughout the speed range of the engine.

Still another object is to provide a variable speed internal combustion engine with a fuel distributing system in which the turbulence in the fuel lines to the respective cylinders is minimized.

Still another object is to provide in combination with an internal combustion engine a fuel distributing system in which the distances between the carburetor and each of the cylinders are rendered substantially equal.

The foregoing objects, and other features and advantages of this invention are attained by a variable speed internal combustion engine comprising essentially of a crank case which has connected thereto one or more piston and cylinder assemblies, each having an intake port and an exhaust port formed in the head end of the respective cylinders. Valving means are provided for valving each of the respective cylinder ports. The respective pistons of the respective cylinders are connected by a connecting rod to a crank shaft rotatably journalled in the crank case. A distributor means including a distributor shaft is connected into driving relationship with the crank shaft. The arrangement is such that the distributor shaft has imparted thereto a direction of rotation which is opposite to that of the crank shaft. A camming means is connected in driving relationship with the distributor means for effecting sequential operation of the intake and exhaust valves of the respective cylinders in an inverse order to that of the crank shaft.

In accordance with this invention, the camming means comprises essentially of a cam shaft which is connected in driving relationship to the distributor shaft. Coupled to the cam shaft, is a variable cam means which is formed as a split sleeve in which the respective parts are coupled to the cam shaft for relative movement with respect to each other. The respective cam parts or sleeve in turn are each provided with a cam segment that defines one half of the admission cam and one half of the exhaust cams. The arrangement of the respective cam segments is such that cam width or angle thereof is varied. Cooperatively associated with the respective variable cam segments are valve actuating means or cam followers which control the opening and closing times of the respective valves accordingly. Means in the form of counterweights are cooperatively associated with the respective cam parts of the variable cam means, the arrangement being such that the counterweights will impart relative movement of the respective cam parts which is proportioned to the varying engine speeds. In accordance with this invention the valve actuating means or cam followers are so disposed that each is actuated by a single variable cam means.

A fuel distributing means is provided for uniformally distributing the fuel to each of the respective cylinders. In accordance with this invention, the fuel distributing means comprises a receptacle for receiving fuel from the carburetor. Conduit means connect the receptacle in communication with each of the intake parts of the respective cylinders. A deflector is rotatably journalled in said receptacle for timing the opening of the conduit means in a manner so that an optimum fuel supply is delivered to the respective cylinders, and the arrangement of the fuel distributing means is such that the distances between the fuel receptacle and the intake port of the respective cylinders are substantially uniform.

A feature of this invention resides in the provision of a variable speed internal combustion engine having a single variable cam segment for sequentially actuating each of the respective intake valves of the cylinders and another single variable cam means for sequentially actuating the respective exhaust ports.

Another feature of this invention resides in the provision of an internal combustion engine in which the opening and closing times of the respective valves is proportional to the speed of the engine to thereby maintain an ideal relationship between the timing of the opening and closing of the valve openings with respect to the speed of the engine to result in obtaining a constant torque.

Another feature of this invention resides in the provision of a fuel distributing means which is provided with a rotating deflector constructed and arranged so as to favor the making of a very homogenous mixture and which fuel distributor is positioned with respect to each of the respective cylinders so that the distance between the fuel distributor and each of the cylinders is substantially uniform or equal.

Another feature of this invention resides in the provision of an internal combustion engine in which a substantially constant torque is obtained by means of an inversely rotating cam shaft which has coupled thereto relatively movable variable width cam means to vary the opening and closing times of the valves in proportion to the speed of the engine.

Another feature of this invention resides in the provision of an internal combustion engine which is relatively simple in structure, simple and easy to fabricate, and which is positive in operation.

Another feature of this invention resides in the provision of an internal combustion engine having means for distributing fuel in a uniform manner to each of the respective cylinders of the engine so as to permit complete filling of the respective cylinders at all speeds within the speed range of the engine.

Another feature of this invention resides in the provision of an internal combustion engine having means for minimizing the turbulence within the fuel lines supplying the respective cylinders with fuel.

Other features and advantages will become more readily apparent when considered in view of the drawings and description in which, FIGURE 1 is a sectional side view of the internal construction engine of the instant invention.

FIGURE 5 is an enlarged detail sectional side view illustrating the coupling arrangement between the distributor shaft and the cam shaft.

FIGURE 6 is a plan view taken along line 6—6 of FIG. 5.

FIGURE 9 is an end view of FIG. 8.

FIGURE 10 is a detail view of the lower split portion of the camming means.

FIGURE 11 is an end view of FIG. 10.

FIGURE 12 is a plan view of the cam shaft illustrating the split camming means thereon in the closed position thereof.

FIGURE 13 is a view similar to that of FIG. 6 but showing the split camming means in the opened position thereof.

FIGURE 14 is a detail sectional view taken through the fuel distributing means.

FIGURE 15 is a detail plan view of the FIG. 14.

Figure 1:
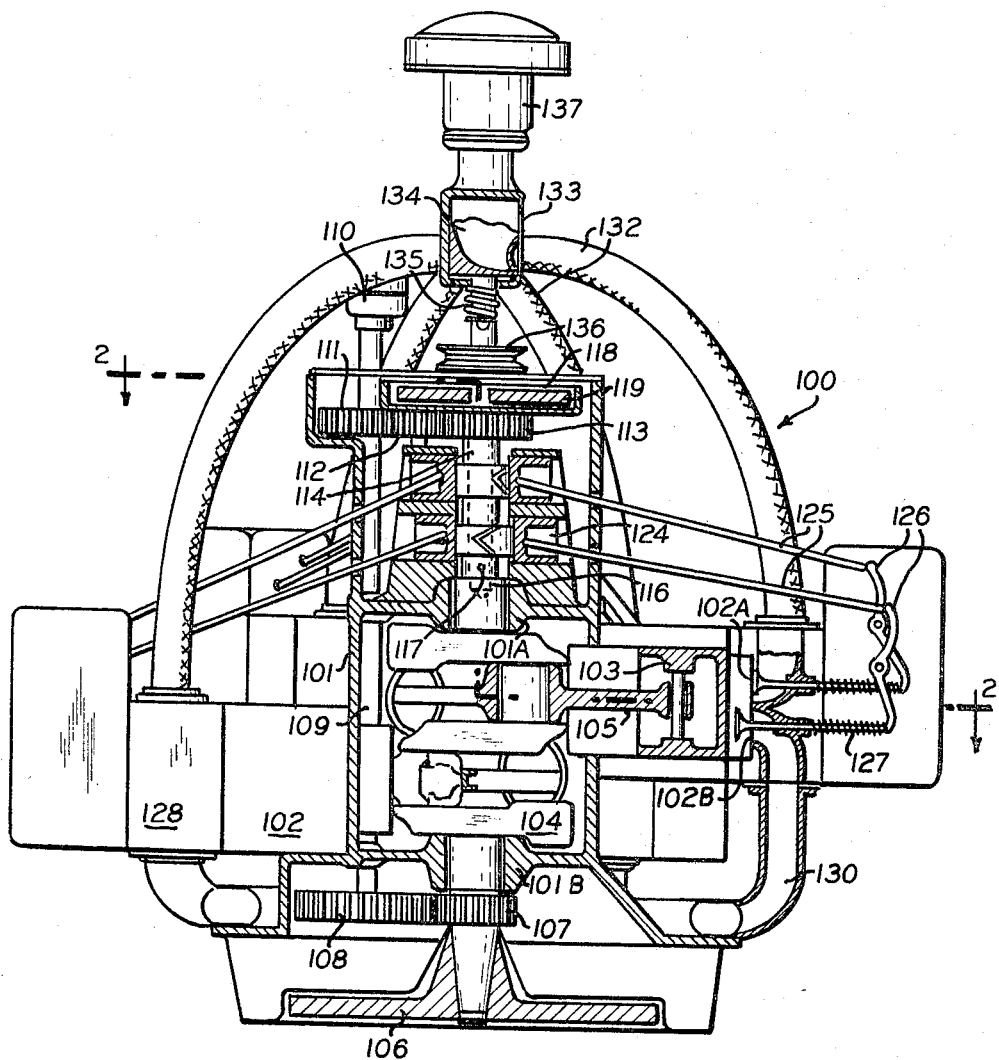
Figure 2:
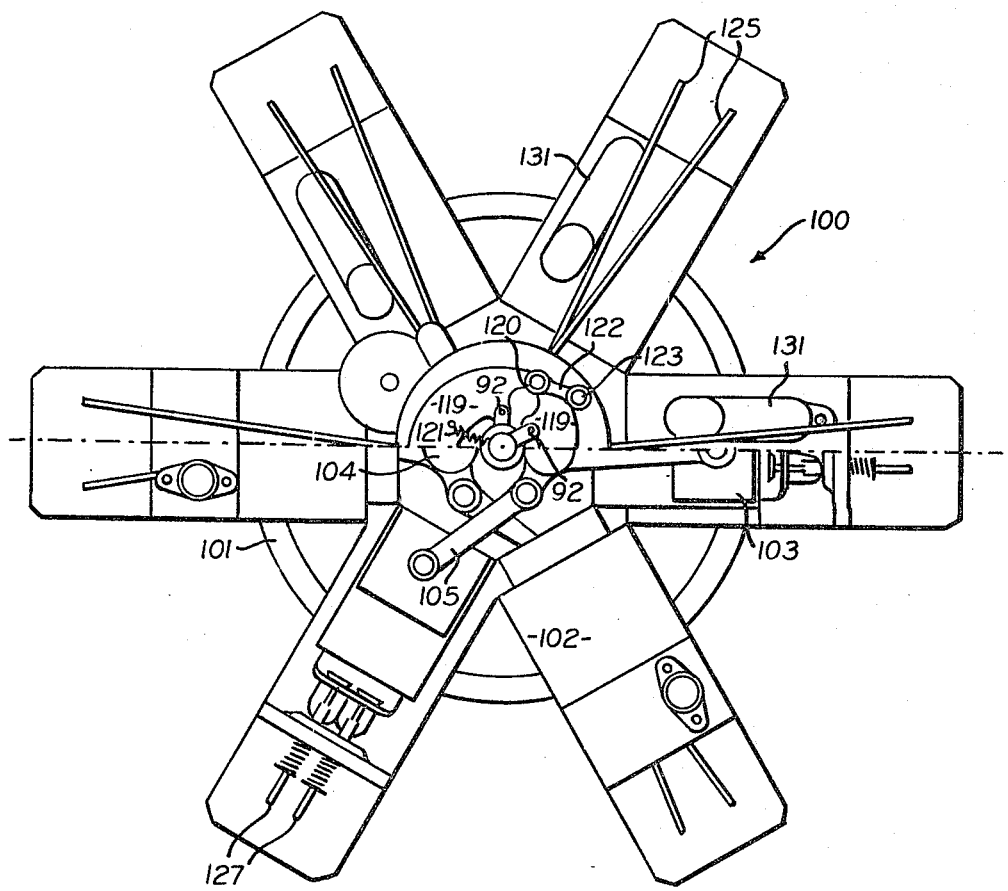
FIGURE 2 is a plan view taken along line 2—2 of FIG. 1.

Referring to the drawings there is shown in FIGS. 1 and 2 an internal combustion engine 100 embodying the principles of the instant invention. It is a four stroke, Otto cycle, internal combustion engine comprising essentially a crank case 101 having integrally connected thereto a plurality of cylinders 102. In the illustrated embodiment six cylinders 102 are depicted, and they are shown as being radially disposed about the crank case 101. However, it will be understood that the principles embodied herein are equally applicable to engines having 1, 2, 3, 6, 9, 12 or other multiples of 3 cylinder engines.

The head ends of the respective cylinders 102 are each formed with an intake port 102A and an exhaust port 102B which are respectively valved by a valving means that includes a valve member 127 and an associated rocker arm 126. Reciprocally mounted in each of the cylinders 102 is a piston head 103, which in turn is connected to a crank shaft 104 by means of a suitable connecting rod 105. As shown, the crank shaft 104 is rotatably journalled in the end bearing 101A, 101B of the crank case 101. A fly wheel 106 is journalled to the lower end of the crank shaft 104 and a timing gear 107 is connected intermediate the ends of the crank shaft adjacent the fly wheel 106.

A distributor means is cooperatively associated with the crank shaft 104. It comprises a distributor shaft 109 which is rotatably journalled in suitable bearings to the crank case 101. Connected to the lower end of the distributor shaft 109 is a gear 108 which is connected in meshing relationship to the timing gear 107. Accordingly the distributor shaft 109 is connected in driving relationship with the crank shaft 104 in a manner so that the distributor shaft 109 has imparted thereto a directional rotation which is opposite that of the crank shaft; when the latter is rotated. A conventional distributor 110 is connected to the upper end of the distributor shaft 109.

In accordance with this invention a novel and unique camming means is cooperatively associated with the distributor means to control the opening and closing times of the respective valves 127 relative to the speed of the engine. Essentially the camming means comprises an inner or central cam shaft 116 and cooperatively associated outer or hollow split cam shaft 114. As best seen in FIGS. 1 and 5, the inner cam shaft 116 is disposed in coaxial alignment with the upper end of the crank shaft 104. Viewing FIGS. 1 and 5, the lower end of the cam shaft 116 is rotatably journalled to the upper end of the crank shaft 104 with a suitable bearing 104B interposed therebetween to permit relative rotation therebetween. Disposed about the cam shaft 116 is a variable cam means which comprises a hollow cam shaft or sleeve 114. As best seen in FIGS. 7 to 11 the hollow cam shaft or sleeve 114 is split into two parts, 114A, 114B, and each part 114A, 114B is provided with one half of an admission cam segment 90A, 90B respectively and one half of an exhaust cam segment 91A, 91B respectively. The arrangement is such that the respective admission cam segments 90A of one split part 114A and exhaust cam segments 91A, are constructed so as to dove tail with the half cam segments 90B, 91B of the other part of the split sleeve or shaft 114B.

In accordance with this invention one split sleeve or shaft section 114A is fixed to the inner cam shaft 116 by means of a pin 117. The other split sleeve or shaft section 114B is not fixed to the cam shaft 116, but is mounted thereon so as to be movable relative to the sleeve section 114A fixed to the cam shaft 116.

As best seen in FIGS. 1, 5 and 6, the upper end of the inner cam shaft 116 and the respective upper ends of the variable split cam sleeve or shaft 114A, 114B extend through the hub of a gear 113 rotatably journalled in axial alignment with the crank shaft. As shown, the gear 113 is provided with a flange portion 118 integrally connected thereto to define a box which enclose counterweights 119 which are operatively connected to the respective segments of the split or hollow variable cam means or shaft 114A, 114B, as will be hereinafter described.

As shown in FIG. 5, gear 113 is connected in driving relationship to the distributor shaft 109 through a gear train comprising a gear 111 journalled to the distributor shaft 109 and an intermediate gear 112 disposed in meshing relationship with gears 111 and 113. Accordingly it will be noted that the gear 113 will have imparted thereto a direction of rotation which is similar to that of the distributor shaft 109 but opposite that of the crank shaft 104.

Referring to the counterweights 119, it will be noted, as seen in FIG. 6, that each is substantially crescent shape, and each is provided with a web 119A having a lug projecting 119B inwardly between the ends thereof. Each of the respective sections 114A, 114B of the split sleeve or shaft of the variable cam means is provided with a projection lug 114C, 114D. Accordingly the respective counterweights 119 are connected to an associated hollow shaft section 114A, 114B by a pin 92 inserted through the bore of the aligned lugs of the counterweight web and the respective hollow shaft sections. As seen in FIG. 6, adjacent end portions of the counterweights webs 119A are hingedly connected by a hinge pin 120. The opposite ends of the counterweights 119 are interconnected by a resilient spring 121. The counterweights in turn are coupled to the gear 113 to rotate therewith by a connector or drawbar 122 which is coupled at one end to the hinge pin 120 and at its other end to the gear 113 by an anchor pin 123. Accordingly it will be noted that the respective counterweights 119 are free to rotate with the gear 113 and depending upon the amount of centrifugal force imparted thereto will function to vary the angular relationship between the variable relatively movable cam sleeve and associated cam segments, accordingly as indicated by angle alpha in FIGS. 12 and 13.

Operatively associated with each of the respective variable dove tail cam segments 90A, 90B and 91A, 91B of the hollow variable cam shaft 114A, 114B are the cam followers or actuators for operating the valves. As shown, the valve actuators or cam followers include a plurality of reciprocally mounted valve guides 124 which are adapted to be displaced by the rotating cam segments 90, 91. A valve guide rod 125 is operatively interconnected between each valve guide 124 and the rocker arm 126 of its respective valve 127 whereby the displacement of the valve guide 124 imparts opening and closing of the valve 127 associated therewith. Accordingly it will be noted that a single cam variable segment 90A, 90B is provided for sequencing the intake valves on each revolution of the cam shaft. Likewise the respective exhaust valves are likewise operated by a single cam segment 91A, 91B.

In accordance with this invention, the construction of the variable cam means is such that variable cam segments are displaced an angular distance in proportion to the centrifugal force imparted the counterweights 119 connected to the respective cam shaft section 114A, 114B. Thus it will be noted that the opening and closing times of the valves 127 are varied in proportion to the speed of the engine.

A fuel distributing means is provided to enhance complete filling or the optimum supply of fuel to each of the respective cylinders 102 at all operating speeds thereof. In the illustrated embodiment the fuel distributing means comprises a receptacle 133 disposed in co-axial alignment with the cam shaft 116 and crank shaft 104; with the carburetor 137 seated thereon. The receptacle 133 is provided with a series of port openings 133A. one opening with each intake port 102A of the respective cylinders 102. A fuel supply conduit 132 connects each of the ports 133A to the intake port 102A of the respective cylinders. With the fuel distributor 133 co-axially disposed, it will be noted that the distance between the fuel supply and each of the cylinders 102 is rendered substantially equal.

Rotatably journalled within the fuel distributing means 133 is a deflector means 134 which is constructed to close all but one of the port openings 133A during operation. As shown, the fuel distributing means 133 is centered about an axle 135 which is coupled to the upper end of the cam shaft 116, FIG. 14, and is thus free to rotate therewith.

As best seen in FIG. 14, the deflector 134 comprises a sort of revolving elbow. As the deflector 134 is driven by the cam shaft 116, the opening of the ports 133A leading to the respective intake cylinder ports 102A are timed to the suction stroke of the associated piston. As the deflector 134 opens but only one port 133A is timed to the suction stroke of its associated piston and closes the inlet to all other ports, the fuel turbulence during admission is reduced to a minimum. The deflector 134 further functions in providing an optimum homogeneous fuel mixture.

The exhaust port 102B of the cylinders opens to a manifold 130.

Figure 3:
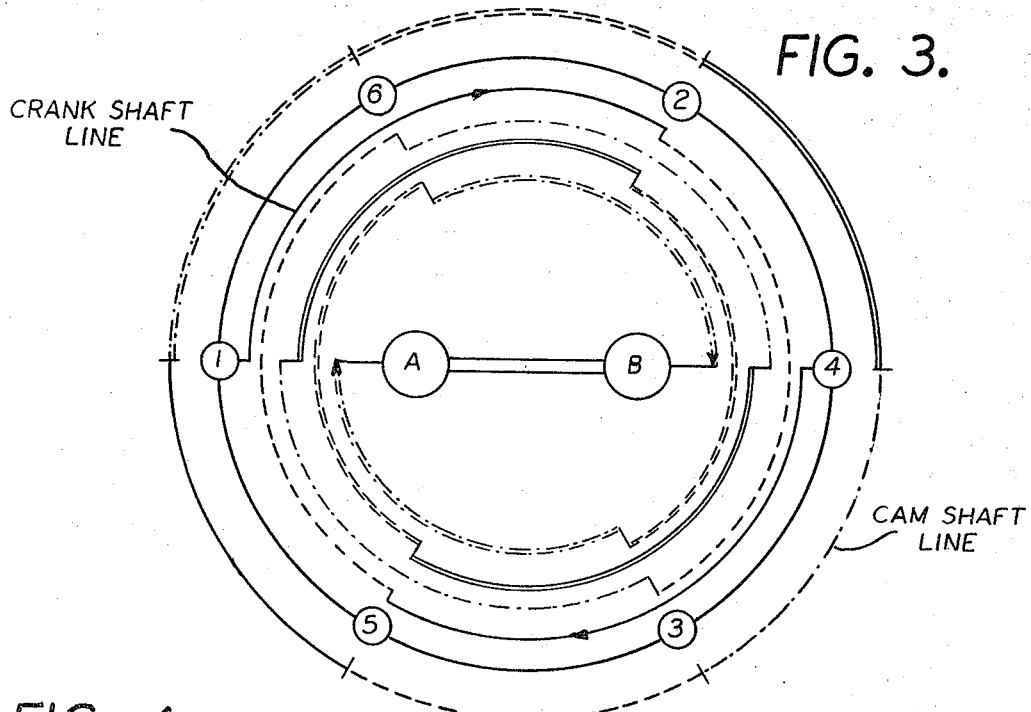
FIGURE 3 is a schematic diagram to illustrate the relative rotation of the crank shaft with respect to the cam shaft during the firing sequence of the engine.
Figure 4:
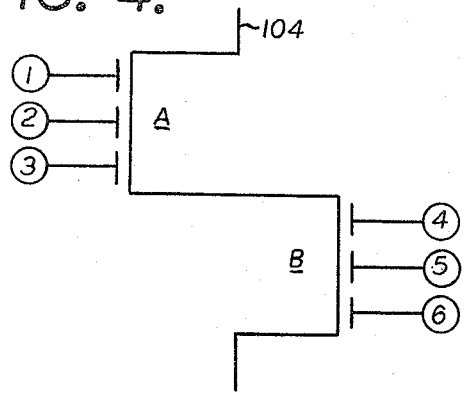
FIGURE 4 is a schematic illustration to show the positions of the crank arm with respect to the piston and cylinder assemblies of the engine.
Figure 7:
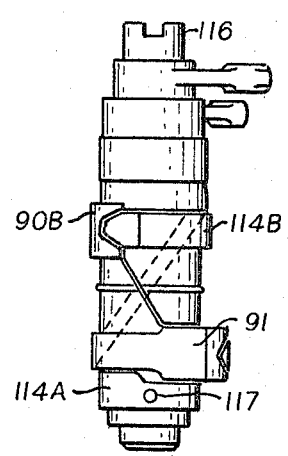
FIGURE 7 is a detail elevation view of the assembled cam shaft.
Figure 8:
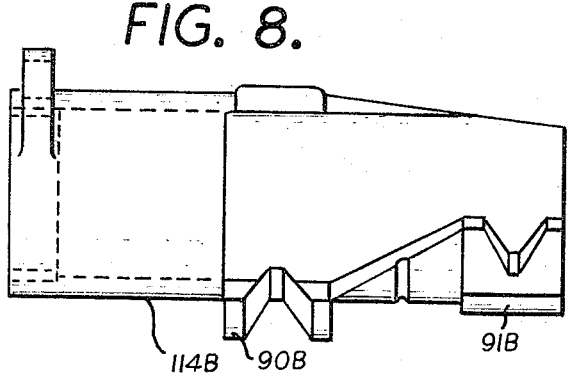
FIGURE 8 is a detail view of the upper split portion of the camming means.

The operation of the internal combustion engine described is as follows:

Essentially, the engine makes a complete cycle every 720°. It has a clockwise rotation with a firing order, by way of example of 1–5–3–4–2–6, as noted in FIG. 3. However, in accordance with this invention, the cam shaft 116 has a counter-clockwise rotation due to the meshing of gears 107, 108 and of gears 111, 112 and 113. The gear ratio in the illustrated embodiment is such that the cam shaft 116 rotates at one half the crank shaft 104 speed. In starting the cycle, referring to FIGS. 3 and 4, the crank pin A of crank shaft 104 is located so that piston 1A is at top dead center while the opposite crank pin B located at 180° therefrom with piston 4B at its top center. When the crank shaft turns 120° clockwise, the pistons at top center are 2A and 5B. (See FIG. 3.) At the same time, the cam shaft has rotated 60° counter-clockwise and puts 5B in ignition time. A new 120° gyration of the crank shaft puts pistons 3A and 6B at top dead center. Meanwhile, the cam shaft has turned 60° and puts 3A cylinder in ignition. A third increment of 120° turns the crank shaft to its starting position while the cam shaft has turned another 60° to put 4B into firing position, as noted in FIG. 3. On the next turn of the crank shaft the cycle is operative for cylinders 4, 2 and 6. Thereafter the 720° cycle is repeated over and over.

While the instant cycle of operation has been described with reference to a six cylinder engine, it may be applied to engines having other number of cylinders.

As the split cam shafts 114A, 114B are coupled to the inner cam shaft 116 for relative angular movement therebetween, the arrangement is such that the faster the engine is turning, the greater will be the centrifugal force imparted to the counterweights 119. As the centrifugal force on the counterweights 119 is increased due to engine speed, the weights 119 tend to separate and produce a widening of the dove-tail cam segments 90A, 90B; 91A, 91B, and consequently varying the opening times of the associated valve accordingly. Thus the timing of the valve openings is automatically governed by the speed of the revolving gear 113, the mass of the counterweights 119 and the tension of spring 121.

Simultaneously the deflector 134 is being rotated at the same speed as the cam shaft 116, thus causing the deflector means 134 to rotate in a synchronous manner so that it opens only the port leading to the conduit 132 channelling fuel to the cylinder in suction time and keeping it open while all the other ports to conduits 132 leading to the other cylinders are closed. In this manner the distribution of the fuel mixture is directed only to the cylinder under suction time at any given instant. The distribution of the fuel thus described minimizes parasitic currents or turbulences that would otherwise obstruct a proper fuel supply. This is accomplished because the rotation of the cam shaft 116 and the deflector coincide in speed and direction, and they follow the successive working steps in the cylinder, inversely to the rotation of the crank shaft.

While the instant invention has been described with reference to a particular embodiment thereof, it will be understood and appreciated that variations and modifications may be made without departing from the spirit or scope of the invention.

What is claimed is:

1. An internal combustion engine for automatically obtaining substantially constant torque over a relatively wide range of engine speeds comprising:
    (a) a plurality of cylinders,
    (b) a piston head reciprocally mounted in each of said cylinders,
    (c) a crank shaft,
    (d) a connecting rod for connecting each of said piston heads to said crank shaft, (e) means defining an intake port and an exhaust port formed in each of said cylinders,
(f) a valve for individually valving the respective intake and exhaust ports of each cylinder,
(g) distributor means including a distributor shaft,
(h) said distributor shaft connected in driving relation with said crank shaft whereby said distributor shaft is driven in a direction opposite to that of the crank shaft,
(i) means for sequencing the operation of the valve of the respective cylinders for obtaining substantially constant torque over a range of variable engine speeds,
(j) said latter means including a cam shaft,
(k) split cam means coupled to said cam shaft for relative movement therebetween, each of said split cam means having a fuel admission cam segment and an exhaust cam segment,
(l) a valve actuator operatively associated with said segments for actuating said valves,
(m) means for varying the relative movement between said two segments of split cam means in proportion to engine speed whereby the timing of the opening and closing of the valves results in a substantially constant torque over a wide range of engine speeds, said means including,
  a counter weight pivotally connected to each of said split cam means,
  means for hingedly connecting adjacent end portions of said counter weights,
  means coupling said weights to rotate with said cam shaft,
  and a resilient means interconnecting the other end of said counter weights,
  said weights cooperating to vary the spacing time of the respective valves in proportion to the centrifugal force produced by said rotating weights.

2. An internal combustion engine for automatically obtaining substantially constant torque over a relatively wide range of engine speeds comprising:
(a) a plurality of cylinders,
(b) a piston head reciprocally mounted in each of said cylinders,
(c) a crank shaft,
(d) a connecting rod for connecting each of said piston heads to said crank shaft,
(e) means defining an intake port and an exhaust port formed in each of said cylinders,
(f) a valve for individually valving the respective intake and exhaust ports of each cylinder,
(g) distributor means including a distributor shaft,
(h) said distributor shaft connected in driving relation with said crank shaft whereby said distributor shaft is driven in a direction opposite to that of the crank shaft,
(i) means for sequencing the operation of the valve of the respective cylinders for obtaining substantially constant torque over a range of variable engine speeds,
(j) said latter means including a cam shaft,
(k) split cam means coupled to said cam shaft for relative movement therebetween, each of said split cam means having a fuel admission cam segment and an exhaust cam segment,
(l) a valve actuator operatively associated with said segments for actuating said valves,
(m) means for varying the relative movement between said two segments of split cam means in proportion to engine speed whereby the timing of the opening and closing of the valves results in a substantially constant torque over a wide range of engine speeds, said means including,
  means for distributing a homogeneous fuel mixture to each of said cylinders,
  said latter means including a fuel chamber,
  said chamber having a series of port openings,
  means connecting each of said port openings to the intake port of the respective cylinders,
  a rotating deflector journalled in said chamber for closing all but one of said ports, and
  said deflector being connected for rotation to said cam shaft whereby the opening of said chamber ports in time to the intake opening of the valve connected in communication with said open port.

3. An internal combustion engine for automatically obtaining substantially constant torque over a relatively wide range of engine speeds comprising:
(a) a crank case having a plurality of radially disposed cylinders,
(b) a piston head reciprocally mounted in each of said cylinders,
(c) a crank shaft rotatably journalled in said crank case,
(d) a connecting rod for connecting each of said piston heads to said crank shaft,
(e) means defining an intake port and an exhaust port formed in each of said cylinders,
(f) a valve for individually valving the respective intake and exhaust of each cylinder,
(g) distributor means including a distributor shaft,
(h) said distributor shaft being connected in driving relationship to said crank shaft so that the direction of rotation of said distributor shaft is opposite to that of the crank shaft,
(i) means for sequencing the valves of the respective cylinders for obtaining substantially constant torque over a range of variable engine speeds,
(j) said latter means including a cam shaft,
(k) split cam means coupled to said cam shaft for relative movement therebetween, each of said split cam means having a fuel admission cam segment and an exhaust cam segment,
(l) a valve guide for each of said valves operatively associated with said segments,
(m) guide rods operatively connecting said valve guide to its respective valve,
(n) means for varying the relative movement between said split cam means in proportion to engine speed,
(o) said latter means including a geared box journalled about said cam shaft means,
(p) a gear train connecting said gear box in driving relationship with said distributor shaft whereby said geared box and associated cam shaft means has imparted thereto a directional rotation opposite that of said crank shaft,
(q) said split cam means extending into said geared box,
(r) a counterweight connected to each of said split cam means and rendered operative to vary the opening time of the respective valves in proportion to the centrifugal force produced by said rotating weights.

4. An internal combustion engine for automatically obtaining substantially constant maximum torque over a relatively wide range of engine speeds comprising:
(a) a crank case having a plurality of radially disposed cylinders,
(b) a piston head reciprocally mounted in each of said cylinders,
(c) a crank shaft rotatably journalled in said crank case,
(d) a connecting rod for connecting each of said piston heads to said crank shaft,
(e) means defining an intake port and an exhaust port formed in each of said cylinders,
(f) a valve for individually valving the respective intake and exhaust of each cylinder,
(g) a timing gear journalled adjacent one end of said crank shaft,
(h) distributor means including a distributor shaft,
(i) said distributor shaft having a gear connected thereto, said gear being disposed in meshing relationship with said timing gear whereby said distributor shaft is driven in a direction opposite to that of the crank shaft,
(j) means for sequencing the operation of the valve of the respective cylinders for obtaining substantially constant torque over a range of variable engine speeds,
(k) said latter means including a cam shaft,
(l) a geared box journalled about said cam shaft means,
(m) a gear train connecting said gear box in driving relationship with said distributor shaft whereby said geared box and associated cam shaft has imparted thereto a directional rotation opposite that of said crank shaft,
(n) split cam means coupled to said cam shaft to effect relative movement therebetween, each of said split cam means having a fuel admission cam segment and an exhaust cam segment, said split cam means extending into said gear box,
(o) a valve guide operatively associated with each of said segments,
(p) guide rods operatively connecting said valve guide to its respective valve,
(q) means for varying the relative movement between said split cam means in proportion to engine speed,
(r) said latter means including a counter weight pivotally connected to each of said split cam means,
(s) means for hingedly connecting adjacent ends of said counter weights,
(t) means fixing the hingedly connected ends to said box whereby said weights are free to rotate with said box,
(u) a resilient means interconnecting the other end of said counter weights,
(v) said weights cooperating to vary the spacing time of the respective valves in proportion to the centrifugal force produced by said rotating weights,
(w) and means for distributing a homogeneous fuel mixture to each of said cylinders,
(x) said latter means including a fuel chamber,
(y) said chamber having a series of port openings,
(z) means connecting each of said port openings to the respective intake ports of the said cylinders,
(aa) a rotating deflector journalled in said chamber for closing all but one of said ports,
(bb) said deflector being connected for rotation to said cam shaft whereby the opening of said chamber ports is timed to the intake opening of the valve connected in communication with said open port.

References Cited by the Examiner

UNITED STATES PATENTS

| | | | |
|---|---|---|---|
| 1,180,334 | 4/1916 | Summers | 123—52 |
| 1,458,481 | 6/1923 | Good | 123—52 |
| 1,757,046 | 5/1930 | Horine | 123—90 |
| 1,863,875 | 6/1932 | Rabezzana | 123—90 |
| 2,183,011 | 12/1939 | Daub | 123—55 |
| 2,279,413 | 4/1942 | Read | 123—90 X |
| 2,907,311 | 10/1959 | Waldron | 123—90 |

FOREIGN PATENTS

| | | |
|---|---|---|
| 841,286 | 2/1939 | France. |
| 1,109,790 | 9/1955 | France. |
| 543,563 | 3/1942 | Great Britain. |
| 870,510 | 6/1961 | Great Britain. |

MARK NEWMAN, *Primary Examiner.*

W. E. BURNS, *Assistant Examiner.*